United States Patent
Tonello

(10) Patent No.: US 10,482,729 B2
(45) Date of Patent: Nov. 19, 2019

(54) SAFETY LIGHT FOR MOBILE MINING EQUIPMENT

(71) Applicant: Paul Tonello, Sudbury (CA)

(72) Inventor: Paul Tonello, Sudbury (CA)

( * ) Notice: Subject to any disclaimer, the term of this patent is extended or adjusted under 35 U.S.C. 154(b) by 0 days.

(21) Appl. No.: 16/151,809

(22) Filed: Oct. 4, 2018

(65) Prior Publication Data

US 2019/0172324 A1 Jun. 6, 2019

(30) Foreign Application Priority Data

Dec. 1, 2017 (CA) .................................. 2987350

(51) Int. Cl.
| | | |
|---|---|---|
| *G08B 5/38* | (2006.01) | |
| *B60Q 1/26* | (2006.01) | |
| *B60Q 1/46* | (2006.01) | |
| *F21S 10/06* | (2006.01) | |
| *H05B 41/30* | (2006.01) | |

(52) U.S. Cl.
CPC .................. *G08B 5/38* (2013.01); *B60Q 1/26* (2013.01); *B60Q 1/46* (2013.01); *F21S 10/06* (2013.01); *H05B 41/30* (2013.01)

(58) Field of Classification Search
CPC ........ G10K 11/00; B60R 25/00; G08B 23/00; G08B 21/00; G08B 1/08
USPC .............. 340/573.1, 679, 540, 7.61; 367/139
See application file for complete search history.

(56) References Cited

U.S. PATENT DOCUMENTS

| | | | | |
|---|---|---|---|---|
| 5,198,800 A | * | 3/1993 | Tozawa ................. | E02F 9/2033 212/276 |
| 5,552,767 A | * | 9/1996 | Toman .................. | G08B 5/006 340/331 |
| 5,763,872 A | * | 6/1998 | Ness ...................... | F21S 9/022 250/214 AL |
| 5,939,986 A | * | 8/1999 | Schiffbauer ........... | B66C 15/045 299/12 |
| 6,134,184 A | * | 10/2000 | Waletzky .............. | A01M 29/16 116/224 |
| 6,292,097 B1 | * | 9/2001 | Tewell .................... | B60Q 1/52 315/83 |
| 6,443,604 B1 | * | 9/2002 | Rudenberg ......... | H05B 37/0272 340/426.13 |
| 6,559,774 B2 | * | 5/2003 | Bergan .................. | G08G 1/081 340/907 |
| 6,710,705 B1 | * | 3/2004 | Smith .................. | A01M 29/10 340/384.2 |

(Continued)

*Primary Examiner* — Nam V Nguyen
(74) *Attorney, Agent, or Firm* — Ryan W. Dupuis; Ade & Company Inc.; Kyle R. Satterthwaite

(57) ABSTRACT

A safety light device is supported on a mobile mining equipment device using an auxiliary battery which is independent of the main battery of the vehicle. The device includes a primary strobe light and a controller which activates the strobe light for the prescribed activation period determined by a timer upon receipt of an activation signal from a motion sensor of the device. A transceiver may optionally be provided to generate the activation signal when detecting wi-fi signals emitted from other work vehicles. The device may include other lights of different color from the primary strobe light for illumination instead of the primary strobe light if certain conditions are met to communicate additional information to persons in proximity to the work vehicle.

16 Claims, 1 Drawing Sheet

(56) References Cited

U.S. PATENT DOCUMENTS

| | | | | |
|---|---|---|---|---|
| 6,963,278 B2* | 11/2005 | Frame | ............... | B66C 15/045 |
| | | | | 340/539.22 |
| 7,088,284 B2* | 8/2006 | Young | ............... | G01S 13/04 |
| | | | | 342/27 |
| 8,651,581 B2* | 2/2014 | Weigel | ............... | E21F 17/18 |
| | | | | 299/1.6 |
| 8,760,289 B2* | 6/2014 | Leppanen | ............ | B66C 15/06 |
| | | | | 340/435 |
| 9,840,193 B1* | 12/2017 | Chea | ............... | B60Q 3/217 |
| 9,910,434 B1* | 3/2018 | Nelson | ............... | H04L 67/125 |
| 2004/0156205 A1* | 8/2004 | Pisciotti | ............ | B60Q 1/305 |
| | | | | 362/485 |
| 2016/0053517 A1* | 2/2016 | Tomaszewski | ........ | E05B 77/26 |
| | | | | 200/573 |
| 2018/0122218 A1* | 5/2018 | Shanley | ............ | G08B 21/02 |

* cited by examiner

SAFETY LIGHT FOR MOBILE MINING EQUIPMENT

This application claims foreign priority benefits from Canadian Patent Application No. 2,987,350 filed Dec. 1, 2017.

FIELD OF THE INVENTION

The present invention relates to a safety light, for example a strobe light, which is supported on mobile mining equipment to alert surrounding personnel of the presence of the mining equipment.

BACKGROUND

Per OHSA regulations, all mobile mining equipment must be equipped with continuously operating strobe lights, that allow workers to see parked vehicles in dark areas. Examples of mobile mining equipment include mining work vehicles such as locomotives, jeeps, loaders, tractors, carrier vehicles, Minecat's, etc. Each mine has numerous machines that may or may not be in production at all times. For example, at Stobie there may be approximately 150 different pieces of equipment, and at Colemon alone they have 50 jeeps and many different equipment that are not in constant use with the strobe light on.

The current strobe design discharges the main battery of the equipment as it is parked. Over an extended period, the battery may fully discharge, leaving the equipment inoperable. The strobe light kills the battery as it operates under the battery power of the machine. If the machine is not being used due to repairs or due to it being parked the strobe light remains on regardless of surrounding risks. The light remains on in a surrounding that has no traffic or workers. At times it is running 24 hrs a day for numerous days at a time off the battery of the machine. When the battery runs down, the battery on any given machine might need to be replaced at a cost ranging from 100-200 dollars per battery plus labor cost anywhere ranging from 1-3 hrs of labor. The machine is down at that time resulting in loss of production as well as a intermittent risk to safety. The machines in question can try a boost of the battery but may not recover. Lastly when repairing a machine in a shop it needs to be parked in a drift area. The machine might need to be sifting there for a few days thus causing the battery to die and other equipment behind to stop producing as a result due to traffic. Operators must then boost the unit or replace the unit taking about 2-3 hours of maintenance time, plus lost time of miners.

SUMMARY OF THE INVENTION

According to one aspect of the invention there is provided a safety light device for use with a mobile mining equipment device, the safety light device comprising:

a safety strobe light for being supported on the mobile mining equipment device which generates a periodic light output when activated;

a motion sensor which generates an activation signal response to movement of objects in proximity to the motion sensor;

a controller in communication with the motion sensor so as to be configured to receive the activation signal from the motion sensor;

the controller including a timer configured to measure a prescribed activation period; and the controller being in communication with the safety strobe light so as to be configured to activate the safety strobe light for the prescribed activation period according to the timer upon receipt of the activation signal from the motion sensor.

The motion sensor is configured such that any approaching person or vehicle could activate the strobe light at a fixed distance. The strobe light could work by motion sensor in existing mines that don't use WiFi or by wireless tracking in mines with WiFi. The device preferably has its own lithium battery so it would charge when running and never drain the main battery of the mobile mining equipment device so as to prevent a no start. The motion sensor would be timer specific as it would be running once it detects movement for an allowed time or stay on while there is traffic or people, thus not draining the battery of any given machine. The device could be standardized to other work machines.

Due to the protection of the main battery from fully discharging, the device according to the present invention will increase production and direct revenue by decreasing machine downtime and making the machine more available. By reducing the frequency of dead battery, the present invention also decreases risk of work place injury resulting from carrying heavy booster packs and getting into tight places to boost or change batteries.

The device preferably further comprises an auxiliary battery independent of the main battery and configured for connection to the mobile mining equipment device for charging the auxiliary battery when the mobile mining equipment device is operating, in which the safety strobe light and the controller are powered by the auxiliary battery.

When used with an additional mining equipment device having a wireless transmitter thereon, the device may further comprise a transceiver connected to the controller and configured to generate an activation signal in response to communication of the transceiver with the wireless transmitter of the additional mining equipment device such that the controller is configured to activate the safety strobe light upon receipt of the activation signal from the transceiver. Preferably the controller is configured to activate the safety strobe light for the prescribed activation period according to the timer upon receipt of the activation signal from the transceiver. Alternatively, the controller may be configured to maintain the safety strobe light activated while the transceiver remains in communication with the wireless transmitter of the additional mining equipment device.

The device may further include a mounting frame including fastener apertures therein so as to be arranged for selective mounting onto the mobile mining equipment device using threaded fasteners. In this instance, the controller, the safety strobe light and the motion sensor are preferably supported on the mounting frame so as to be selectively removable together from the mining equipment device upon removal of the threaded fasteners. When the device further includes a transceiver connected to the controller and configured to generate an activation signal in response to communication of the transceiver with a wireless transmitter on an additional mining equipment device, the transceiver is preferably also supported on the mounting frame so as to be removable from the mobile mining equipment device together with the mounting frame.

The device may optionally also include at least one auxiliary strobe light which is different in color from the safety strobe light, in which the controller is configured to activate the auxiliary strobe light instead of the safety strobe light in response to a respective activation criterium being met. In some embodiments, there may be provided a pair of the auxiliary strobe lights which are different in color from one another and which are configured to be activated by the controller according to different activation criterium. The activation criterium of one of the auxiliary strobe lights may be the activation of a master switch of the mobile mining equipment device. The activation criterium of another one of the auxiliary strobe lights may be the activation of an auxiliary switch of the mobile mining equipment device which is independent of a master switch of the mobile mining equipment device. For example, According to a second aspect of the present invention there is provided a safety light device for use with a mobile mining equipment device and an additional mining equipment device having a wireless transmitter thereon, the safety light device comprising:

a safety strobe light for being supported on the mobile mining equipment device which generates a periodic light output when activated;

a transceiver connected to the controller and configured to generate an activation signal in response to communication of the transceiver with the wireless transmitter of the additional mining equipment device a controller in communication with the motion sensor so as to be configured to receive the activation signal from the transceiver;

the controller including a timer configured to measure a prescribed activation period; and the controller being in communication with the safety strobe light so as to be configured to activate the safety strobe light for the prescribed activation period according to the timer upon receipt of the activation signal from the transceiver.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
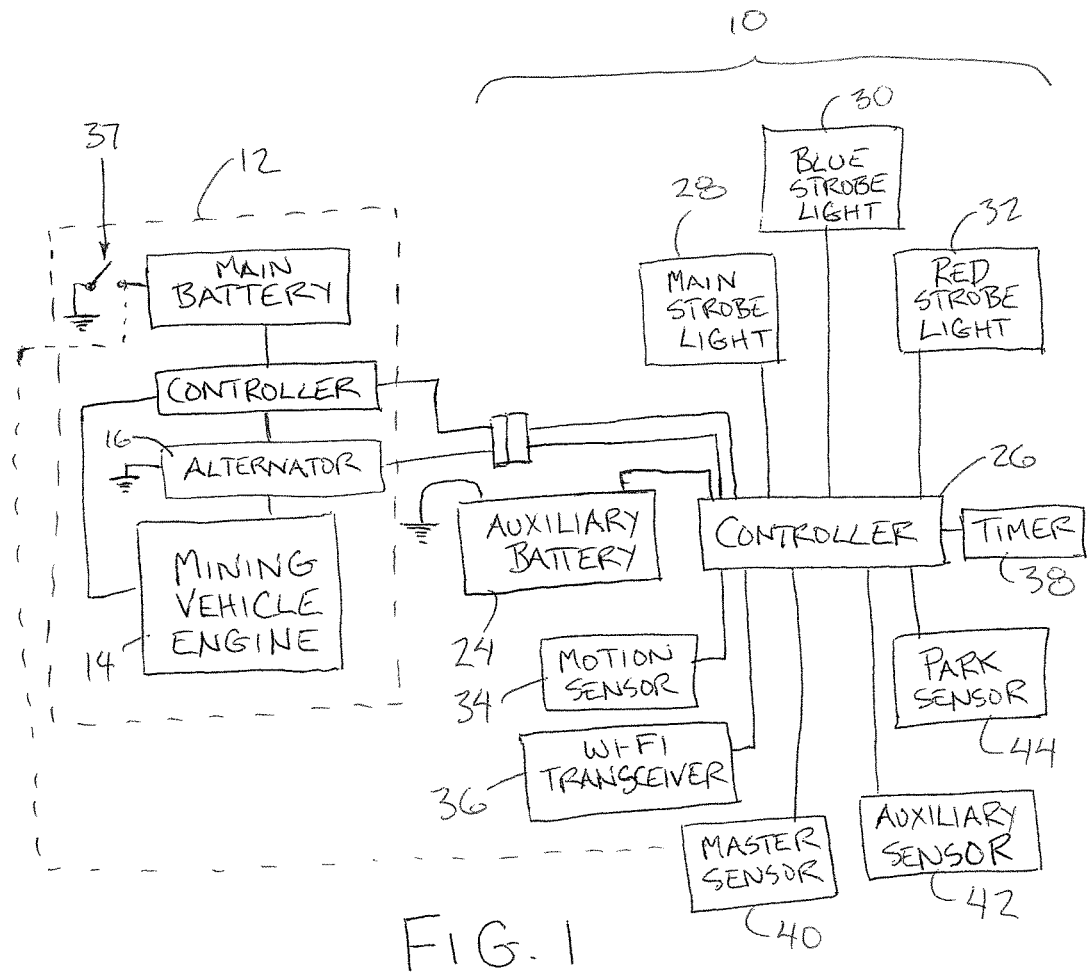
FIG. 1 is a schematic representation of the safety light device according to the present invention.
Figure 2:
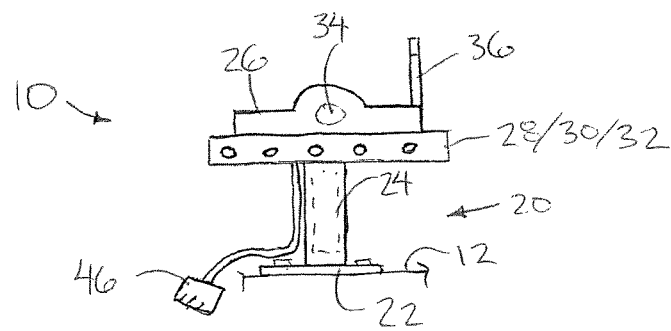
FIG. 2 is an illustration of one embodiment of the safety light device according to FIG. 1 for mounting onto a mining equipment device.

Referring to the accompanying figures there is illustrated a safety light device which is indicated by reference numeral 10. The device 10 is particularly suited for use with a mobile mining equipment device 12.

A typical mobile mining equipment device may include personal transport vehicles such as a Jeep, other types of personnel or equipment transporters, a locomotive, a loader, or a tractor and the like. The mining equipment device typically includes an engine 14 which provides power for driving the mining equipment device and for performing work with the mining equipment device. The engine drives an alternator 16 which generates electrical power for charging a main battery 18 of the mining equipment device which is used for starting and running the engine 14 and to provide electrical power to various accessories on the mining equipment device.

The device 10 includes a mounting frame 20 having a base plate 22 with fastener apertures therein to allow threaded fasteners to be received through the base plate for selectively fasting the mounting frame to a frame or body of the mining equipment device. In this manner the mounting frame can be readily removed and replaced if required simply by removal of the threaded fasteners.

The mounting frame supports an auxiliary battery 24 thereon which is independent of the main battery of the mining equipment device but which is operatively connected to the mining equipment device through a controller 26 which controls charging of the auxiliary battery during operation of the mining equipment device.

The controller 26 is a programmable computer device having a memory and a processor for executing programming stored in the memory. The controller derives power from the auxiliary battery and is also supported on the mounting frame 20. The controller is thus configured to operate the safety light device as described herein.

A primary strobe light 28 is also supported on the mounting frame 20. The primary strobe light is a clear, white light which produces a periodic flashing output when activated. This may be accomplished by activating and deactivating a light source, or by providing steady illumination from a light source which is directional and rotating so that the light output to an observer at any fixed location surrounding the primary strobe light will be perceived as periodic and flashing. The strobe light 28 is coupled to the controller 26 for being powered by the auxiliary battery 24 of the device 10.

The device 10 according to the illustrated embodiment includes a first auxiliary light 30 and a second auxiliary light 32 comprising strobe lights which are configured to produce a periodic flashing output similarly to the primary strobe light, however the first auxiliary light in this instance is blue in colour while the second auxiliary light is red in colour, contrary to the white light from the primary strobe light. The auxiliary lights are also supported on the mounting frame and are coupled to the controller for being operated according to the function of the controller using electrical power from the auxiliary battery.

In order to activate the primary strobe light 28, the controller is operatively connected to a motion sensor 34 also supported on the mounting frame for communication with the controller. The motion sensor 34 senses motion in any direction about the mining equipment device at a prescribed distance or radius. The prescribed distance is an adjustable setting on the controller. Furthermore, the sensitivity of the sensor is adjustable to enable detection of a large variety of devices including people or vehicles in motion relative to the device 10 within the prescribed radius about the mining equipment device. Upon detection of motion, the motion sensor 34 generates an activation signal which is communicated to the controller.

In some embodiments, the mounting frame further supports a transceiver 36 thereon which is in communication with the controller. The transceiver 36 is adapted to communicate wirelessly with the transmitter on an auxiliary mining equipment device. The transceiver may communicate using various communication protocols including Wi-Fi for example. When the auxiliary mining equipment devices in the environment of the mobile mining equipment device 12 are provided with a transmitter to emit a wireless proximity signal detectable by the transceiver 36 when within a prescribed proximity range, the transceiver 36 generates an activation signal and continues to communicate the activation signal to the controller as long as the transceiver 36 remains in active communication with the transmitter of the auxiliary mining equipment device.

The controller includes a timer 38 incorporated therein which measures duration of a prescribed activation period.

The prescribed activation period is stored on the controller and can be adjusted in duration through operator controls on the controller.

Under normal operation, the controller typically activates the primary strobe light 28 for the duration of the prescribed activation period in response to receipt of the activation signal from either one of the motion sensor or the transceiver. In the instance of a transceiver, the controller may operate to simply maintain the primary strobe light 28 activated for as long as the transceiver 36 continues to communicate with the transmitter of an auxiliary mining equipment device.

In other modes of operation, the controller may communicate with the corresponding controller of the mobile mining equipment device to sense if the master switch 37 of the mining equipment device has been switched on. When the master switch is turned on as sensed by a master sensor 40, a corresponding master activation signal is communicated to the controller. In this instance the controller activates the first auxiliary light 30 instead of the primary strobe light 28 upon receipt of the signal.

In a further mode of operation, the mining equipment device may be provided with an auxiliary switch that the operator manually activates under certain conditions, for example when transporting explosives using the mining equipment device. An auxiliary sensor 42 is provided in this instance to detect when the auxiliary switch has been activated by the operator to generate an auxiliary activation signal. The auxiliary activation signal is communicated from the sensor 42 to the controller. In this instance the controller will then activate the second auxiliary light 32 instead of the primary strobe light 28 in response to the auxiliary signal.

In order to confirm normal operation of the primary strobe light 28, the controller may rely on confirmation that the master switch of the mining equipment device is off, or alternatively a park sensor 42 may confirm that the mining equipment device is parked.

The device 10 described herein can be readily implemented into a variety of mining equipment devices by supporting all of the lights, the controller, the motion sensor, the transceiver and the corresponding antenna thereof, and the auxiliary battery, all on a common mounting frame which can be readily attached and removed from the mining equipment device using threaded fasteners.

A wiring harness is provided on the controller with a standard plug 46 which can be snap-fit into mating connection with a corresponding communication port on the mining equipment device to allow communication of the controller 26 of the device 10 with the corresponding controller of the mining equipment device through the wiring harness and rely on various mining equipment sensors to detect the operating condition of the mining equipment device, for example detecting the condition of the master switch of the mining equipment device and the like.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A safety light device for use with a mobile mining equipment device, the safety light device comprising:
   a safety strobe light for being supported on the mobile mining equipment device which generates a periodic light output when activated;
   a motion sensor which generates an activation signal response to movement of objects in proximity to the motion sensor;
   a controller in communication with the motion sensor so as to be configured to receive the activation signal from the motion sensor;
   the controller including a timer configured to measure a prescribed activation period; and
   at least one auxiliary strobe light which is different in color from the safety strobe light;
   the controller being in communication with the safety strobe light so as to be configured to activate the safety strobe light for the prescribed activation period according to the timer upon receipt of the activation signal from the motion sensor; and
   the controller being configured to activate the auxiliary strobe light instead of the safety strobe light in response to a respective activation criterium being met.

2. The safety light device according to claim 1 for use with a mobile mining equipment device having a main battery for operating the mobile mining equipment device, the safety light device further comprising an auxiliary battery independent of the main battery and configured for connection to the mobile mining equipment device for charging the auxiliary battery when the mobile mining equipment device is operating, the safety strobe light and the controller being powered by the auxiliary battery.

3. The safety light device according to claim 1 for use with an additional work vehicle having a wireless transmitter thereon, the safety light device further comprising a transceiver connected to the controller and configured to generate an activation signal in response to communication of the transceiver with the wireless transmitter of the additional work vehicle, the controller being configured to activate the safety strobe light upon receipt of the activation signal from the transceiver.

4. The safety light device according to claim 3 wherein the controller is configured to activate the safety strobe light for the prescribed activation period according to the timer upon receipt of the activation signal from the transceiver.

5. The safety light device according to claim 3 wherein the controller is configured to maintain the safety strobe light activated while the transceiver remains in communication with the wireless transmitter of the additional work vehicle.

6. The safety light device according to claim 1 further comprising a mounting frame including fastener apertures therein so as to be arranged for selective mounting onto the mobile mining equipment device using threaded fasteners, and wherein the controller, the safety strobe light and the motion sensor are supported on the mounting frame so as to be selectively removable together from the mobile mining equipment device upon removal of the threaded fasteners.

7. The safety light device according to claim 6 further comprising a transceiver connected to the controller and configured to generate an activation signal in response to communication of the transceiver with a wireless transmitter on an additional work vehicle, the transceiver being supported on the mounting frame so as to be removable from the mobile mining equipment device together with the mounting frame.

8. The safety light device according to claim 1 wherein said at least one auxiliary strobe light comprises a pair of auxiliary strobe lights which are different in color from one another and which are configured to be activated by the controller according to different activation criterium.

9. The safety light device according to claim 1 wherein the activation criterium of one of the auxiliary strobe lights is the activation of a master switch of the mobile mining equipment device.

10. The safety light device according to claim 1 wherein the activation criterium of one of the auxiliary strobe lights is the activation of an auxiliary switch of the mobile mining equipment device which is independent of a master switch of the mobile mining equipment device.

11. A safety light device in combination with a mobile mining equipment device having a main battery for operating the mobile mining equipment device, the safety light device comprising:
- a safety strobe light supported on the mobile mining equipment device which generates a periodic light output when activated;
- a condition sensor operatively connected to the mobile mining equipment device so as to be arranged to sense a prescribed operating condition of the mobile mining equipment device;
- a controller in communication with the condition sensor and the safety strobe light so as to be configured to activate the safety strobe light in response to sensing of the prescribed operating condition;
- an auxiliary battery independent of the main battery and configured for connection to the mobile mining equipment device for charging the auxiliary battery when the mobile mining equipment device is operating; and
- at least one auxiliary strobe light which is different in color from the safety strobe light;
- the safety strobe light and the controller being powered by the auxiliary battery; and
- the controller being configured to activate the auxiliary strobe light instead of the safety strobe light in response to a respective activation criterium being met.

12. The safety light device according to claim 11 wherein the mobile mining equipment device includes a master switch for activating the mobile mining equipment device and wherein the condition sensor comprises a master sensor arranged to detect when the master switch is activated such that the controller activates the safety strobe light when the master switch is activated.

13. The safety light device according to claim 11 wherein the mobile mining equipment device is a vehicle capable of being parked and wherein the condition sensor comprises a park sensor arranged to detect when the vehicle is parked such that the controller activates the safety strobe light when the vehicle is parked.

14. The safety light device according to claim 11 further comprising a mounting frame including fastener apertures therein so as to be arranged for selective mounting onto the mobile mining equipment device using threaded fasteners, and wherein the controller, the safety strobe light and the auxiliary battery are supported on the mounting frame so as to be selectively removable together from the mobile mining equipment device upon removal of the threaded fasteners.

15. The safety light device according to claim 11 wherein said at least one auxiliary strobe light comprises a pair of auxiliary strobe lights which are different in color from one another and which are configured to be activated by the controller according to different activation criterium.

16. The safety light device according to claim 11 wherein the activation criterium of one of the auxiliary strobe lights is the activation of an auxiliary switch of the mobile mining equipment device which is independent of a master switch of the mobile mining equipment device.

* * * * *